US010783170B2

(12) United States Patent
Sharma et al.

(10) Patent No.: US 10,783,170 B2
(45) Date of Patent: Sep. 22, 2020

(54) GEOTAGGING A LANDSCAPE PHOTOGRAPH

(71) Applicant: Adobe Inc., San Jose, CA (US)

(72) Inventors: Ashish Sharma, Noida (IN); Anubhav Jain, Faridabad (IN)

(73) Assignee: Adobe Inc., San Jose, CA (US)

( * ) Notice: Subject to any disclaimer, the term of this patent is extended or adjusted under 35 U.S.C. 154(b) by 438 days.

(21) Appl. No.: 15/241,148

(22) Filed: Aug. 19, 2016

(65) Prior Publication Data

US 2018/0052839 A1 Feb. 22, 2018

(51) Int. Cl.
*G06F 16/29* (2019.01)
*G06T 7/70* (2017.01)

(52) U.S. Cl.
CPC ............... *G06F 16/29* (2019.01); *G06T 7/70* (2017.01)

(58) Field of Classification Search
None
See application file for complete search history.

(56) References Cited

U.S. PATENT DOCUMENTS

| 8,135,566 | B2 * | 3/2012 | Marshall | G06T 17/20 345/428 |
| 9,824,482 | B2 * | 11/2017 | Kunath | G06T 15/005 |
| 2003/0079187 | A1 * | 4/2003 | Desplats | G06F 17/5068 700/109 |
| 2008/0198158 | A1 * | 8/2008 | Iwamura | G06T 15/20 345/419 |
| 2010/0156906 | A1 * | 6/2010 | Montgomery | G06T 15/205 345/427 |
| 2012/0086728 | A1 * | 4/2012 | McArdle | G06F 3/0481 345/633 |
| 2012/0120069 | A1 * | 5/2012 | Kodaira | G06F 17/30271 345/419 |
| 2012/0183204 | A1 * | 7/2012 | Aarts | G06T 15/205 382/154 |
| 2013/0328931 | A1 * | 12/2013 | Wolcott | G06T 11/60 345/633 |
| 2015/0325038 | A1 * | 11/2015 | Baker | G06T 15/205 345/426 |
| 2016/0002882 | A1 * | 1/2016 | Kanari | E02F 3/435 701/50 |
| 2018/0045504 | A1 * | 2/2018 | Jiang | G01B 11/02 |

* cited by examiner

*Primary Examiner* — Thu N Nguyen
(74) *Attorney, Agent, or Firm* — Finch & Maloney PLLC

(57) ABSTRACT

Techniques are disclosed for assigning a geographical location to a photograph of a landscape. A geographic location tag is calculated from raw sensor data and a three-dimensional terrain map that corresponds to the landscape in the photograph. One technique includes calculating a two-dimensional ideal view projection of a camera used to take the landscape photograph based at least in part on a geographic location of the camera when the landscape photograph was taken and a field of view of the camera when the landscape photograph was taken. At least one of the topographical features visible from the camera based on the two-dimensional ideal view projection is selected from a three-dimensional terrain map representing a plurality of topographical features within a geographic region. At least one geographic location tag representing at least one of the selected topographical features is assigned to the landscape photograph.

20 Claims, 8 Drawing Sheets

Visible Distance

Ideal View Projection

GEOTAGGING A LANDSCAPE PHOTOGRAPH

FIELD OF THE DISCLOSURE

This disclosure relates generally to the field of geolocation tagging, or geotagging, and more particularly, to techniques for assigning geographical information to a photograph of a landscape.

BACKGROUND

A database of photographic images can be searched based on, for example, tags, labels, colors, geographic locations, and other information associated with the image. In some cases, the geographic location associated with a particular image is the location of the camera used to take the image, as opposed to the location of the scenery appearing in the image, particularly when the scenery is at a great distance from the camera. For instance, if the camera is present at location X when a photograph of location Y is taken, the image will be associated with location X but not necessarily with location Y appearing in the image. As a result, a search for images of location X will produce an image of location Y taken from location X. Thus, if a user wishes to find all the photographs of, for example, Mount Everest, and searches by its location, then all photos that were geotagged with the location of Mount Everest will be provided in the search results. This may include photographs taken at Mount Everest as well as photographs taken at other locations but manually geotagged with Mount Everest. However, Mount Everest may be visible in many other photographs that were taken from a great distance and do not include Mount Everest as a geotag, and these photographs may not show up in search results. As such, although the location of the camera can provide approximate results, these results are not necessarily relevant or complete results. Presently, there are no known techniques assigning geographical information to a landscape photograph based on the parameters of the camera, such as location and field of view. Therefore, improved techniques are desirable for geotagging landscape photographs with more accuracy than with existing techniques.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Figure 1:
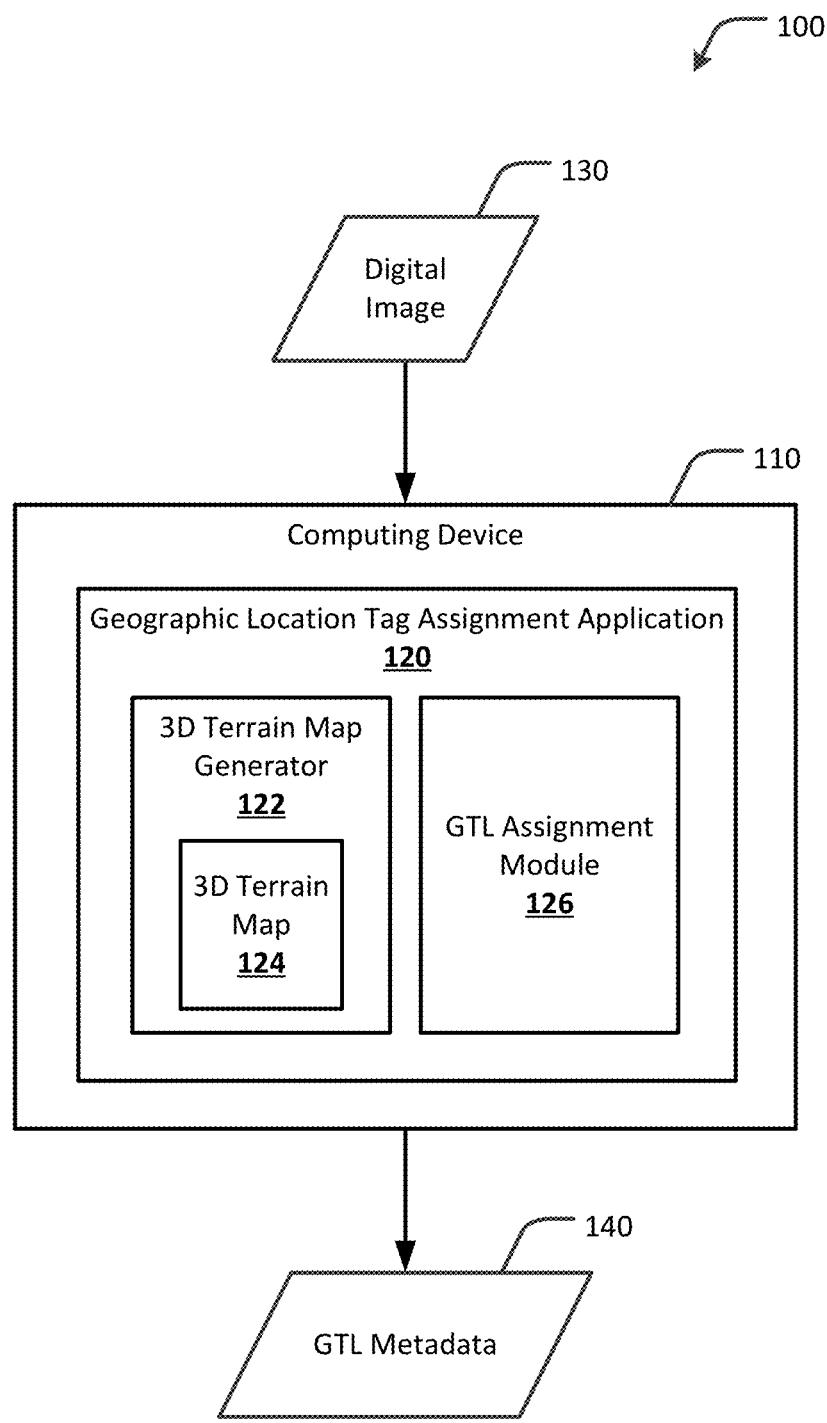
FIG. 1 shows an example system for assigning a geographical location to a photograph of a landscape, in accordance with an embodiment of the present disclosure.

In accordance with an embodiment of the present disclosure, techniques are disclosed for assigning a geographical location to a photograph of a landscape. A geographic location tag (GTL) is a metric that is used to identify locations, features and objects appearing in a photograph of a landscape. In an embodiment, the GTL is calculated from raw sensor data, including camera type, camera location (e.g., Global Positioning System or GPS coordinates), camera direction and tilt, camera zoom, and camera mode. The GTL is further calculated using a three-dimensional (3D) terrain map that corresponds to the landscape in the photograph. The 3D terrain map represents topographical features within a geographic region, such as the elevation of various points on the surface of the Earth or other spheroid. For example, the 3D terrain map may represent mountains, canyons, hills, plains, valleys, escarpments, water surfaces, or man-made structures such as buildings and bridges. The 3D terrain is generated from topographical data or obtained from another source that pre-computes the 3D terrain map. A two-dimensional (2D) ideal view projection of a camera used to take the landscape photograph is calculated based at least in part on a geographic location of the camera when the landscape photograph was taken and a field of view of the camera when the landscape photograph was taken. The 2D ideal view projection represents the maximum area of terrain within a geographic region that is theoretically visible to the observer for a given field of view or viewing direction. In some cases, the 2D ideal view projection is calculated based on a visible distance of the camera and an arc of consideration of the camera. The arc of consideration is based at least in part on an angle of view of the camera and the visible distance of the camera, where the 2D ideal view projection includes a circular sector defined by the arc of consideration and the geographic location of the camera, such as described with respect to FIGS. 3 and 4.

In an embodiment, at least one of the topographical features of the geographic region visible from the camera is selected from a projection of the 3D terrain map onto the 2D ideal view projection, where topographical features in the projection that do not face away from the camera are selected. A GTL representing at least one of the selected topographical features is then assigned to the landscape photograph based on one or more of the selected topographical features. In some cases, the selected topographical features are a subset of the topographical features that are within the 2D ideal view projection and for which a dot product of a normal vector of each of the topographical features in the subset projected onto the 2D ideal view projection, and a direction vector of the camera is negative or zero (i.e., a non-positive dot product), such as described with respect to FIG. 5. The dot product allows topological features on the 3D terrain map that are not visible to the camera to be separated from topological features that are potentially visible to the camera within the 2D ideal view projection. Numerous configurations and variations will be apparent in light of this disclosure.

In accordance with various embodiments, the GTL generated using the techniques disclosed herein allows for assigning relevant and accurate location information to landscape photographs. The GTL also allows for subsequently searching databases of landscape photographs based on the location of objects appearing in the photographs as well as the location of the camera used to take the photographs. Thus, when a user searches for a particular location, all photographs containing images of that location are returned to the user based on the information in the GTL, no matter where the photograph was taken. Further, in some embodiments, the information in the GTL is used for clustering or curation of photograph collections containing images of the same location(s). Additionally, the information in the GTL supports a search query "show me all photographs of location X taken from location Y." In some embodiments, metadata representing the GTL is stored separately from other metadata representing the location of the camera and other camera parameters.

FIG. 1 shows an example system 100 for assigning a geographical location to a photograph of a landscape, in accordance with an embodiment of the present disclosure. The system 100 includes a computing device 110 having one or more processors configured to execute a geographic location tag assignment application 120. The application 120 includes a 3D terrain map generator 122 and a GTL assignment module 126, each of which is executable, controllable, or both, by one or more processors of the computing device 110. The 3D terrain map generator 122 is configured to generate a 3D terrain map 124.

The application 120 is configured to receive one or more digital images 130 and to generate GTL metadata 140. The images 130 represent photographs of one or more landscapes, along with metadata representing one or more camera parameters associated with the photographs, such as camera type, camera location (e.g., Global Positioning System or GPS coordinates), camera direction and tilt, camera zoom, and camera mode. The GTL assignment module 126 is configured to receive, via the 3D terrain map generator 122, the 3D terrain map 124. In some embodiments, the 3D terrain map 124 may be pre-generated and stored for subsequent retrieval by the GTL assignment module 126. In response to receiving the 3D terrain map 124, the GTL assignment module 126 is further configured to generate the GTL metadata 140, which is assigned to or otherwise associated with the digital image 130. Although FIG. 1 depicts a single computing device 110, it will be understood that, in some embodiments, portions of the processing performed by the geographic location tag assignment application 120 is distributed among multiple computing devices (e.g., a back-end server may be configured to generate the 3D terrain map 124 or the GTL metadata 140).

Figure 2:
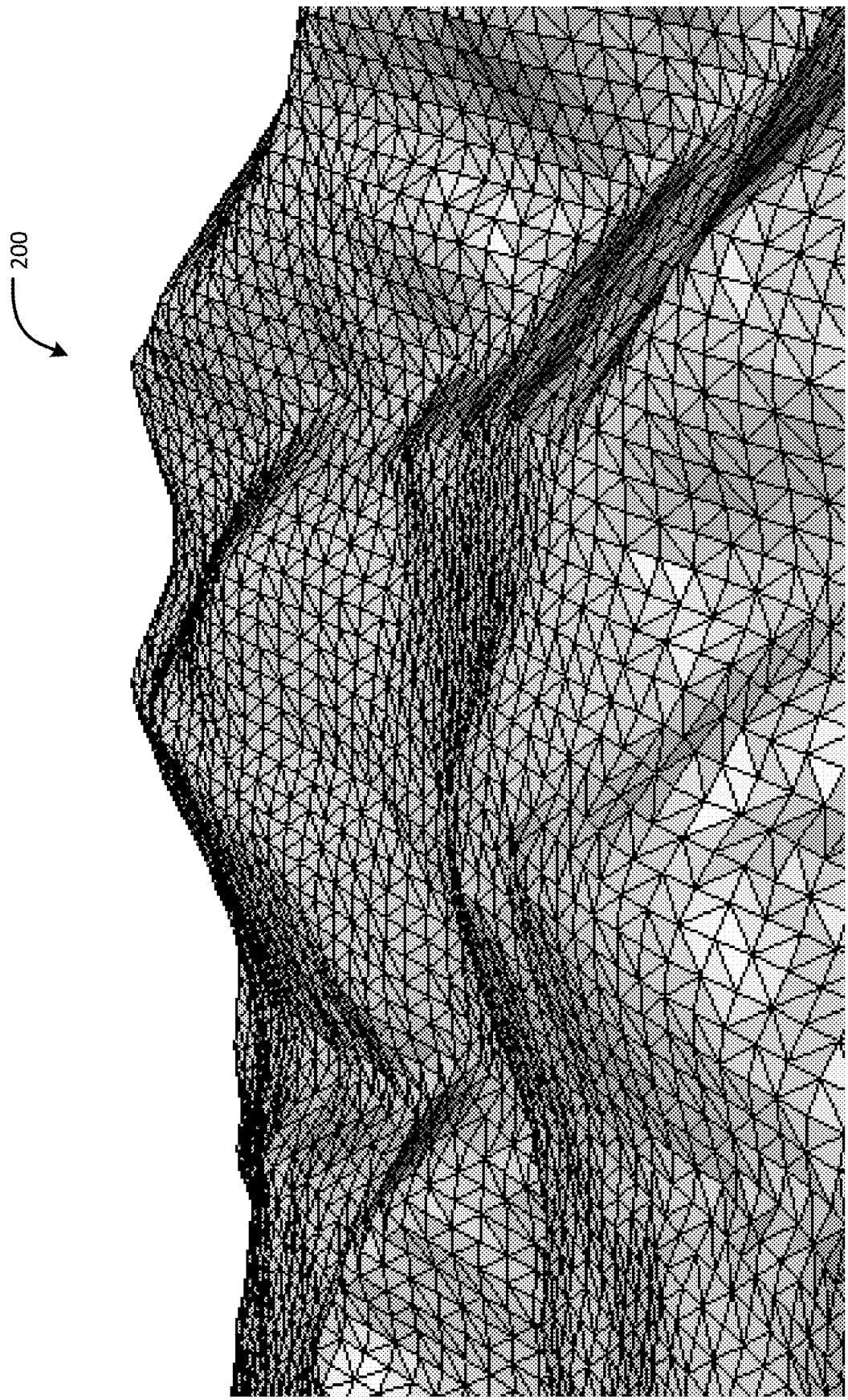
FIG. 2 shows an example graphical representation of a 3D terrain map of a geographic region.

FIG. 2 shows an example graphical representation of a 3D terrain map of a geographic region 200. The geographic region 200 may, for example, include various points on the surface of the Earth or another spheroid that can be represented by elevation (e.g., height above mean sea level), longitude and latitude. Information about the terrain in the geographic region 200 is decomposed and stored as a set of contiguous triangles or other polygons, such as a Delaunay triangulation where the plane of each triangle or polygon approximates the actual surface of the corresponding terrain. For example, the 3D terrain map 200 may include a plurality of polygons, where each polygon represents a topographical feature of the terrain as a function of a relative location of the topographical feature within the geographic region, a height or elevation of a geographic location of the respective topological feature, a geographic coordinate (e.g., latitude and longitude) of the respective topological feature, or any combination of these.

In an embodiment, a normal vector (not shown in FIG. 2, but described in further detail with respect to FIG. 5) is defined with respect to the plane of each triangle or polygon to indicate the direction that the plane faces with respect to a reference frame. For instance, for perfectly flat and level terrain, the normal vector of each triangle will generally have only a skyward (geographic bearing neutral) component, whereas for mountainous terrain, such as along the slope of a hill, the normal vector of each triangle will generally include a geographic bearing component (e.g., north, northeast, east, etc.) that indicates which direction and at what angle the terrain faces with respect to a spherical or, in the case of the Earth, a semi-spherical surface. As will be described in further detail below, in some embodiments, the normal vector of each triangle or polygon on the 3D terrain map is used to determine whether a given point on the surface of the geographic region faces toward or away from a camera located at a particular geographic location and height.

In some embodiments, a 2D ideal view projection is constructed for an observer, such as a camera, located at a particular geographic location and height. The 2D ideal view projection represents the maximum area of terrain within a geographic region that is theoretically visible to the observer for a given field of view or viewing direction, absent any obstruction to the visibility of any points of the terrain such as caused by mountains or canyons. In other words, the view projection is considered ideal when no point of terrain within the field of view is obstructed from the view of the observer by another point on the terrain. According to an embodiment, the 2D ideal view projection is an area defined by an arc of consideration of the observer, which is a function of the visible distance of the observer and a two-dimensional field of view of the observer. A description of an example 2D ideal view projection is provided below with respect to FIGS. 3 and 4.

Figure 3:
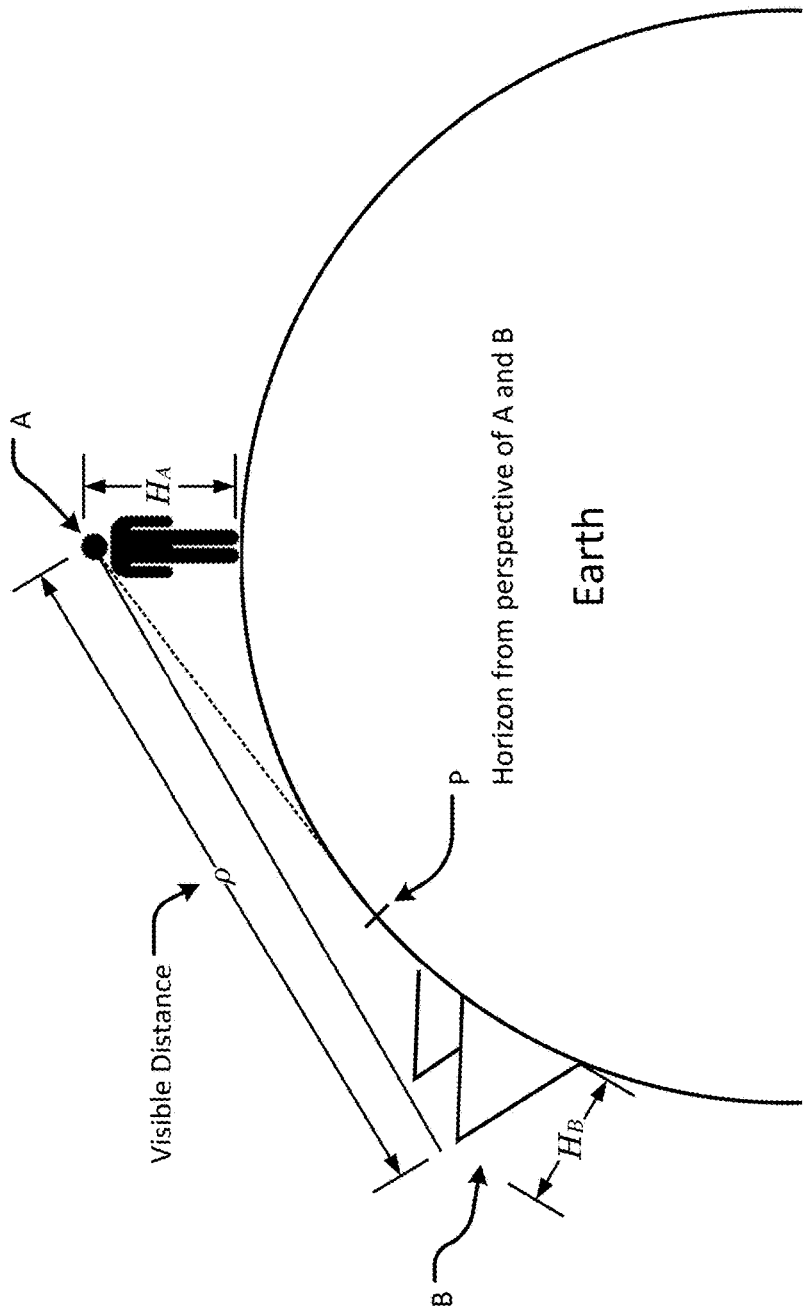
FIG. 3 shows an example diagrammatic representation of a visible distance of an observer, in accordance with an embodiment of the present disclosure.

FIG. 3 shows an example diagrammatic representation of a visible distance $\rho$ of an observer A, in accordance with an embodiment of the present disclosure. It will be understood that, for clarity, FIG. 3 is not drawn to scale. The visible distance p is the maximum distance between the observer A (e.g., a camera) and the most distant object B that extends above the horizon P. The object B may, for instance, be a point on the surface of the Earth, including natural and artificial objects. Objects that are beyond the maximum visible distance $\rho$ are not visible to the observer A. The visible distance p may represent, for example, the distance to the most distant object B that the observer A can observe due to the curvature of the Earth, notwithstanding the effects on light caused by the terrain and the atmosphere. Note that the most distant object that is actually visible to the observer A may not be the most distant object that is theoretically observable by the observer A if the visibility of the most distant object is obscured by another, closer object. Here, the visible distance p presumes that the most distant object that is theoretically observable by the observer A is not obscured by any other object. Objects that are actually obscured by other objects are taken into account in further calculations based on the visible distance $\rho$, as discussed herein.

In FIG. 3, ρ represents the visible distance between an observer A standing at a height of $H_A$ above a reference point (e.g., sea level), and an object B having a height of $H_B$, where both the observer A and the object B are visible from the same point on the horizon P. The object B may, for example, be a feature of the terrain in the geographic region, such as a mountain. If either the observer A or the object B are at or near the lowest height (e.g., at sea level), then $H_A$ or $H_B$, respectively, is essentially zero, and the visible distance is the distance between the observer A and the horizon P. Otherwise, as noted above, the visible distance is the distance between the observer A and the most distant object B that extends above the horizon. The visible distance ρ for an observer on a spheroid such as Earth is calculated as follows:

$$\rho = \sqrt{H_A(2+H_A)} + \sqrt{H_B(2R+H_B)}$$

where R is the radius of the spheroid (e.g., the radius of Earth). Where the visible distance is measured in nautical miles and the height is measured in feet, and the maximum heights of the observer A and the object B are small with respect to R, the visible distance ρ is approximated as follows:

$$\rho \approx \sqrt{H_A} + \sqrt{H_B}$$

Figure 4:
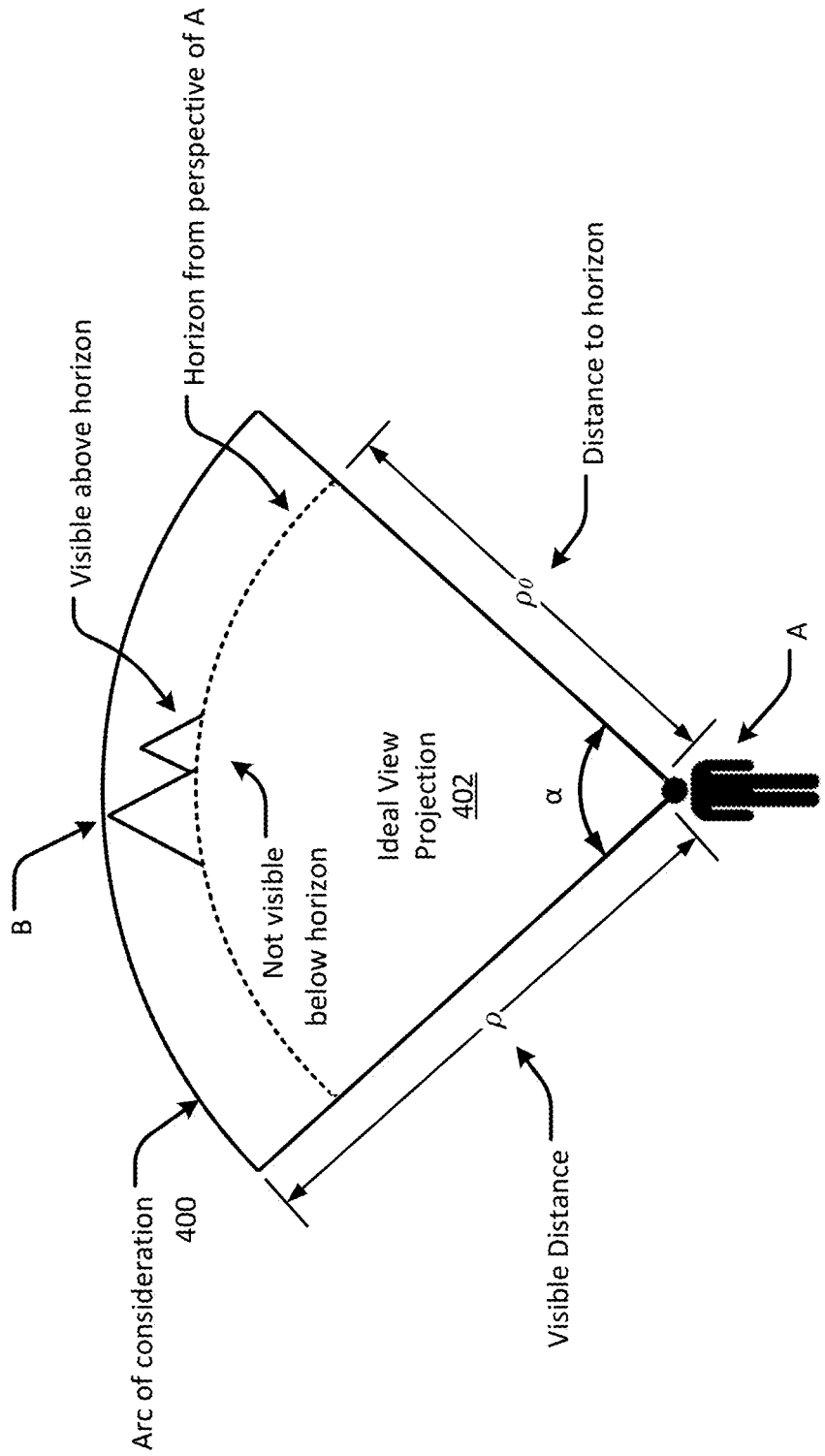
FIG. 4 shows an example diagrammatic representation of an arc of consideration and an ideal view projection of an observer, in accordance with an embodiment of the present disclosure.

FIG. 4 shows an example diagrammatic representation of an arc of consideration 400 and a 2D ideal view projection 402 of the observer A of FIG. 3, in accordance with an embodiment of the present disclosure. As discussed with respect to FIG. 3, ρ represents the visible distance between the observer A and the most distant object B in the geographic region. Note that the visible distance ρ may be larger than the distance between the observer A and the horizon from the perspective of the observer A if the object B extends above the horizon. Otherwise, if no objects extend above the horizon, the visible distance ρ is the distance between the observer A and the horizon. The term α represents a field of view angle of the observer A. The arc of consideration 400 is a function of the visible distance ρ and the field of view α, or, in other words, an arc prescribed by the visible distance ρ over the entire field of view α. The 2D ideal view projection 402 is a circular sector 402 having a radius ρ and an angle α. The 2D ideal view projection 402 is defined at one end by the arc of consideration 400 and at the other end by the geographic location of the observer A.

Figure 5:
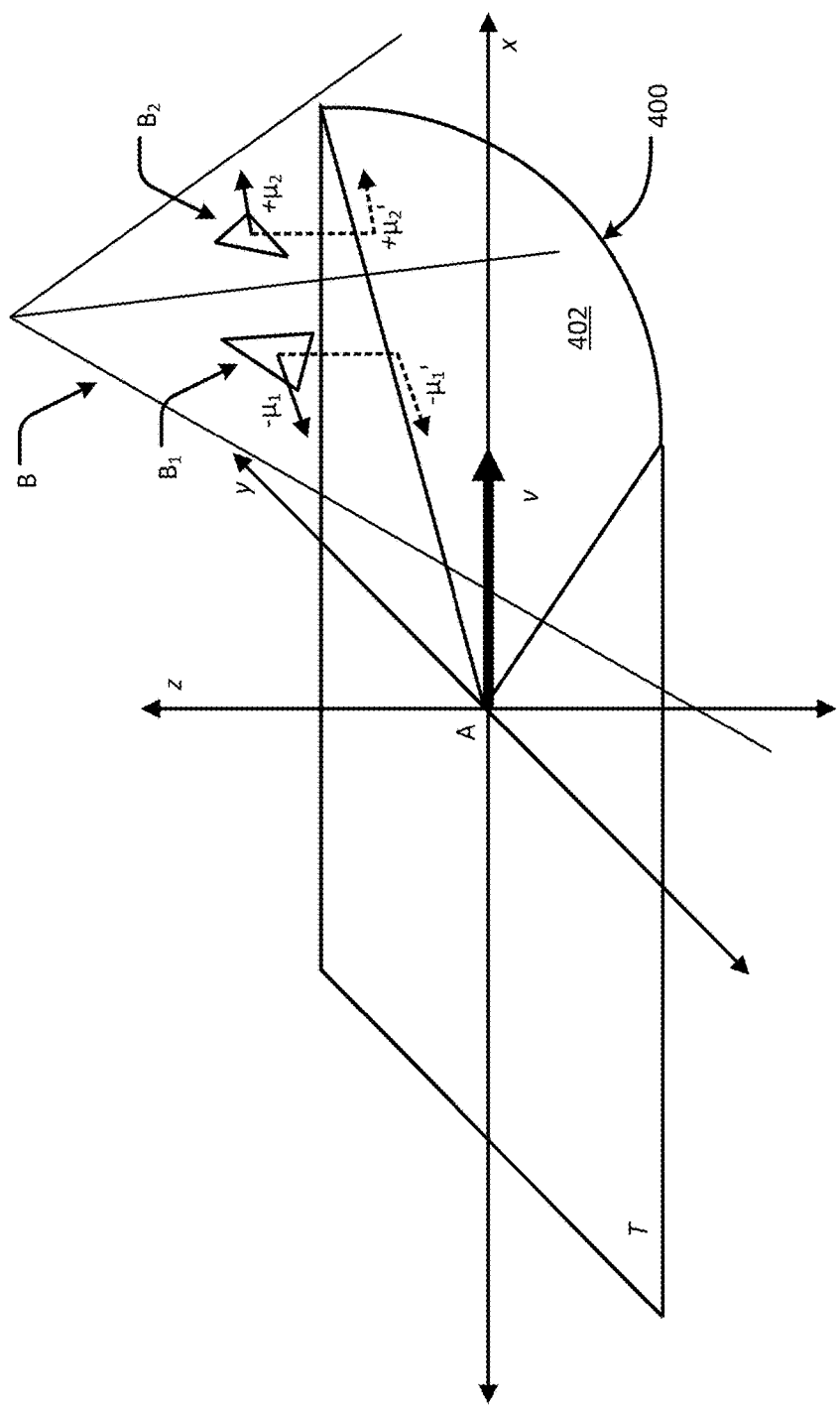
FIG. 5 shows an example graphical representation of a portion of the ideal view projection of FIG. 4, in accordance with an embodiment of the present disclosure.

FIG. 5 shows an example graphical representation of a portion of the 2D ideal view projection 402 of FIG. 4 overlaid by a 3D terrain map, in accordance with an embodiment of the present disclosure. The 2D ideal view projection 402 is shown superimposed on a two-dimensional plane T, where the origin of the plane T is the location of the observer A, and the object B is positioned relative to the location of the observer A. The 3D terrain map includes the object B, which is represented by a plurality of triangles or other polygons such as described with respect to FIG. 2. For clarity and explanatory purposes, only two such triangles $B_1$, $B_2$ are shown, although it will be understood that the 3D terrain map may include many more such triangles or polygons. It will be understood that the object B is not necessarily a photographic image of the object, but may include an artificial representation of the object, such as topographic data representing the latitude, longitude and height of the object at various points in the 3D terrain map.

Each of the triangles $B_1$, $B_2$ has a corresponding normal vector $\mu_1$, $\mu_2$ that, when projected onto the two-dimensional plane T, can have a positive component or negative component $-\mu_1'$, $+\mu_2'$ with respect to a viewing direction vector v extending from the observer A. In some cases, the component with respect to the viewing direction vector v can be zero, such as where the projected normal vector $\mu_1$, $\mu_2$ is perpendicular to the vector v. The vector v generally represents the viewing direction of the observer A within the 2D ideal view projection. The viewing direction vector v may, for example, bisect the arc of consideration 400. In some embodiments, the viewing direction vector v is calculated based on the direction and tilt of a camera.

For example, consider that the object B is a mountain having at least two faces. Triangle $B_1$ is a topographical feature on a mountain face that faces towards the observer A, and triangle $B_2$ is a topographical feature on a mountain face that faces away from the observer A. In this example scenario, the portion of the object B including triangle $B_1$ is visible to the observer A, unless another object (not shown) obstructs the view of the object B. Likewise, the portion of the object B including triangle $B_2$ is not visible to the observer A because that portion faces away from the observer. In some embodiments, all or a subset of all of the topographical features that are visible to the observer A (e.g., including triangle $B_1$ but excluding triangle $B_2$) are selected from the 3D terrain map based on the 2D ideal view projection 402. A GTL is assigned to the landscape photograph corresponding to the 2D ideal view projection 402 based on the selected topographical features.

In one example, as shown in FIG. 5, the dot product of the vector v and the projected normal vector $\mu_1'$ is negative, and the dot product of the viewing direction vector v and the projected normal vector $\mu_2'$ is positive. If the dot product of the vector v and the projected normal vector of any polygon representing the object B is positive, then the respective polygon is not visible to the observer A, and removed from the 3D terrain map. The remaining polygons are included in the 3D terrain map during further processing, such as described below. Thus, the topographical features selected from the 3D terrain map will all have a non-positive dot product.

In some embodiments, each of the triangles that have a negative or zero dot product of the projected normal vector and the viewing direction vector v, such as described in the preceding paragraph, are rendered to a simulated camera frame based on one or more camera parameters including imaging resolution (e.g., width and height of the frame in pixels), the field of view angle α, the viewing direction vector v of the camera, the height or elevation of the camera location, and the location of the camera (e.g., latitude and longitude). In some embodiments, the triangles are rendered onto the simulated frame using a z-buffer algorithm in which objects close to the camera are rendered in front of objects that are more distant from the camera. After the simulated camera frame is rendered, if any given triangle is painted on the frame (i.e., not obscured by another triangle), then a z-index corresponding to the object and a reference to the triangle are stored for each respective pixel containing the triangle. Next, a graph algorithm of connected components is used to find connected groups of triangles stored for each rendered pixel. Two triangles are connected if the triangles share an edge. Since each triangle maps to a two-dimensional region on the plane T, geographic regions of interest on the 3D terrain map can be identified based on the connected groups of triangles. This set of geographic regions on the 3D terrain map is used to generate a GTL for a landscape photograph of the corresponding region.

Figure 6:
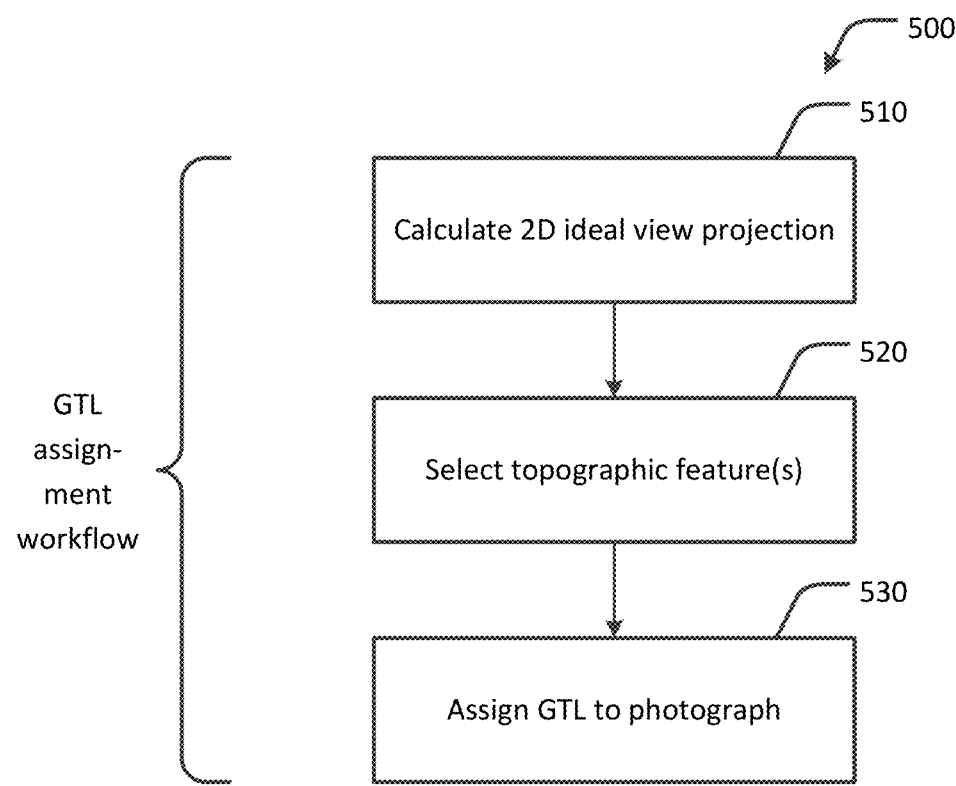
FIG. 6 shows an example methodology for assigning a geographical location to a photograph of a landscape, in accordance with an embodiment of the present disclosure.

FIG. 6 shows an example methodology 500 for assigning a geographical location to a photograph of a landscape, in accordance with an embodiment of the present disclosure.

The method 500 includes calculating 510 a two-dimensional ideal view projection of a camera used to take the landscape photograph based at least in part on a geographic location of the camera when the landscape photograph was taken and a field of view of the camera when the landscape photograph was taken, such as described above with respect to FIGS. 3 and 4. The method 500 further includes selecting 520, from a three-dimensional terrain map representing a plurality of topographical features within a geographic region, at least one of the topographical features based on the two-dimensional ideal view projection, the at least one of the topological features being visible from the camera, such as described above with respect to FIG. 5. The method 500 further includes assigning 530, to the landscape photograph, at least one geographic location tag (GTL) representing at least one of the selected topographical features. The GTL may, for example, include metadata representing one or more of the topographical features on the 3D terrain map, such as place names, geographical coordinates, name tags, or other identifying information.

In some embodiments, the GTL assigned to the landscape photograph represents a portion of the geographic region having at least two adjacent selected topographical features. For example, two adjacent points on a 3D terrain map may represent a portion of the geographic region associated with the GTL. In some embodiments, the three-dimensional terrain map includes a plurality of polygons, each polygon representing one of the topographical features as a function of a relative location within the geographic region, a height of a geographic location of the respective topological feature, a geographic coordinate of the respective topological feature, or any combination of these.

Figure 7:
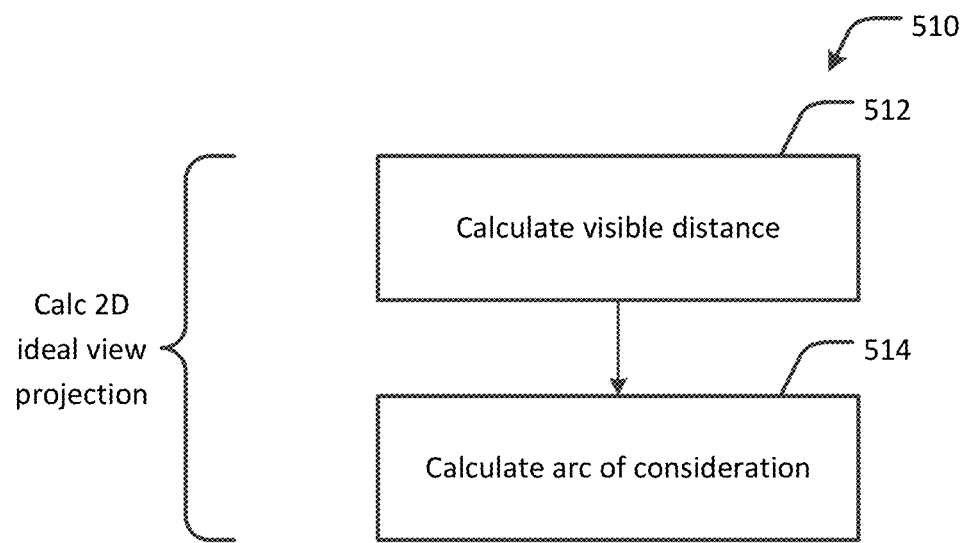
FIG. 7 shows an example methodology for calculating the 2D ideal view projection, in accordance with an embodiment of the present disclosure.

FIG. 7 shows an example methodology 510 for calculating the 2D ideal view projection, in accordance with an embodiment of the present disclosure. The method 510 includes calculating 512 a visible distance of the camera based at least in part on an elevation of the geographic location of the camera, such as described with respect to FIG. 3. The method 510 further includes calculating 514 an arc of consideration based at least in part on an angle of view of the camera and the visible distance, where the two-dimensional ideal view projection comprises a circular sector defined by the arc of consideration and the geographic location of the camera, such as described with respect to FIG. 4.

Figure 8:
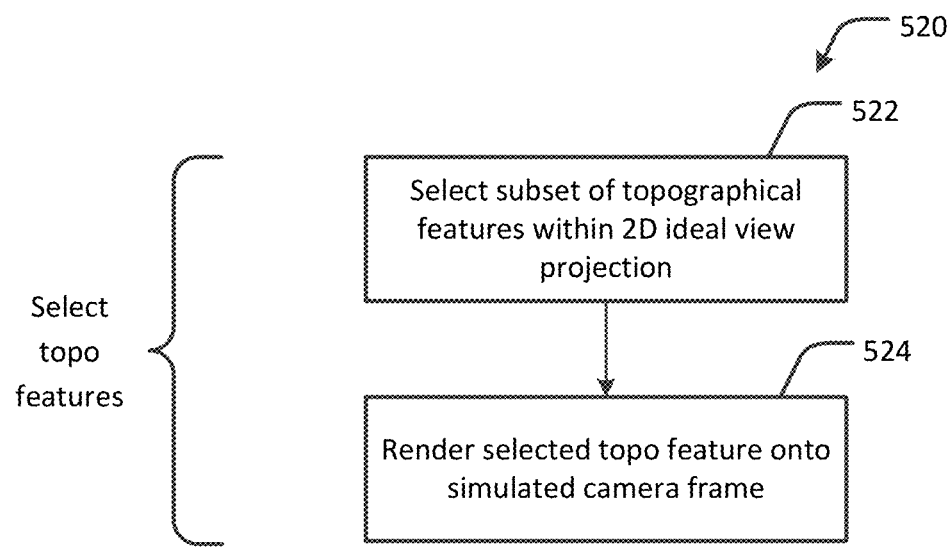
FIG. 8 shows an example methodology for selecting topographical features visible by the observer, in accordance with an embodiment of the present disclosure.

FIG. 8 shows an example methodology 520 for selecting the topographical features visible by the observer (e.g., the camera), in accordance with an embodiment of the present disclosure. The method 520 includes selecting 522 a subset of the topographical features that are within the two-dimensional ideal view projection and for which a dot product of a projected normal vector of each of the topographical features in the subset and a direction vector of the camera is negative or zero, such as described with respect to FIG. 5. In some embodiments, the direction vector of the camera bisects the arc of consideration. In some embodiments, the method 520 includes rendering the selected topographical features onto a simulated camera frame using a z-buffer algorithm, where the GTL assigned to the landscape photograph represents the selected topographical features rendered at a z-buffer depth closest to the simulated camera frame.

Figure 9:
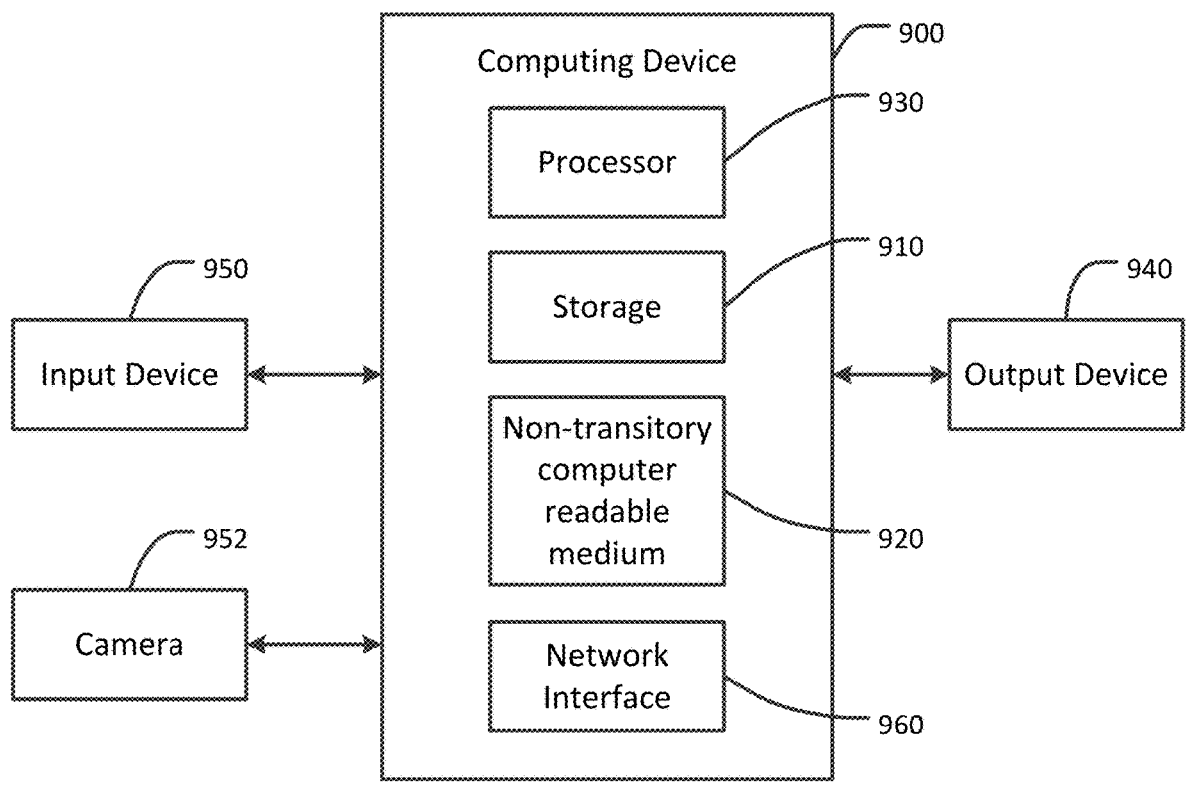
FIG. 9 is a block diagram representing an example computing device that may be used to perform any of the techniques as variously described in this disclosure.

FIG. 9 is a block diagram representing an example computing device 900 that may be used to perform any of the techniques as variously described in this disclosure. For example, the system 100 of FIG. 1, or any portions thereof, and the methodologies of FIGS. 6, 7, 8, or any portions thereof, may be implemented in the computing device 900. The computing device 900 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 900 includes one or more storage devices 910 or non-transitory computer-readable media 920 having encoded thereon one or more computer-executable instructions or software for implementing techniques as variously described in this disclosure. The storage devices 910 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions or software that implement various embodiments as taught in this disclosure. The storage device 910 may include other types of memory as well, or combinations thereof. The storage device 910 may be provided on the computing device 900 or provided separately or remotely from the computing device 900. The non-transitory computer-readable media 920 may include, but are not limited to, one or more types of hardware memory, non-transitory tangible media (for example, one or more magnetic storage disks, one or more optical disks, one or more USB flash drives), and the like. The non-transitory computer-readable media 920 included in the computing device 900 may store computer-readable and computer-executable instructions or software for implementing various embodiments. The computer-readable media 920 may be provided on the computing device 900 or provided separately or remotely from the computing device 900.

The computing device 900 also includes at least one processor 930 for executing computer-readable and computer-executable instructions or software stored in the storage device 910 or non-transitory computer-readable media 920 and other programs for controlling system hardware. Virtualization may be employed in the computing device 900 so that infrastructure and resources in the computing device 900 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 900 through an output device 940, such as a screen or monitor, which may display one or more user interfaces provided in accordance with some embodiments. The output device 940 may also display other aspects, elements or information or data associated with some embodiments. The computing device 900 may include other I/O devices 950 for receiving input from a user, for example, a keyboard, a joystick, a game controller, a pointing device (e.g., a mouse, a user's finger interfacing directly with a touch-sensitive display device, etc.), or any suitable user interface. The computing device 900 may include other suitable conventional I/O peripherals, such as a camera 952. The computing device 900 includes or is operatively coupled to various suitable devices for performing one or more of the aspects as variously described in this disclosure.

The computing device 900 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 900 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system, such as the geographic location tag application 120, the 3D terrain map generator 122, the 3D terrain map 124, the GTL assignment module 126, or any combination of these, is implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors or databases in different configurations and arrangements, and that the depicted embodiments are not intended to be limiting. Various components of this example embodiment, including the computing device 900, may be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described herein can be combined in any number of configurations. One example embodiment provides a computer-implemented method of audience segmentation. The method includes calculating a two-dimensional ideal view projection of a camera used to take the landscape photograph based at least in part on a geographic location of the camera when the landscape photograph was taken and a field of view of the camera when the landscape photograph was taken; selecting, from a three-dimensional terrain map representing a plurality of topographical features within a geographic region, at least one of the topographical features based on the two-dimensional ideal view projection, the at least one of the topological features being visible from the camera; and assigning, to the landscape photograph, at least one geographic location tag (GTL) representing at least one of the selected topographical features. In some cases, the calculating of the two-dimensional ideal view projection includes calculating a visible distance of the camera based at least in part on an elevation of the geographic location of the camera; and calculating an arc of consideration based at least in part on an angle of view of the camera and the visible distance, where the two-dimensional ideal view projection comprises a circular sector defined by the arc of consideration and the geographic location of the camera. In some cases, the selecting of the at least one of the topographical features includes selecting a subset of the topographical features that are within the two-dimensional ideal view projection and for which a dot product of a projected normal vector of each of the topographical features in the subset and a direction vector of the camera is non-positive. In some such cases, the direction vector of the camera bisects the arc of consideration. In some cases, the selecting of the at least one of the topographical features includes rendering the at least one of the selected topographical features onto a simulated camera frame using a z-buffer algorithm, where the at least one GTL assigned to the landscape photograph represents the at least one of the selected topographical features rendered at a z-buffer depth closest to the simulated camera frame. In some cases, the at least one GTL assigned to the landscape photograph represents a portion of the geographic region having at least two adjacent selected topographical features. In some cases, the three-dimensional terrain map comprises a plurality of polygons, each polygon representing one of the topographical features as a function of a relative location within the geographic region, a height of a geographic location of the respective topological feature, a geographic coordinate of the respective topological feature, or any combination of these.

Another example embodiment provides, in a digital medium environment for processing images, a system for assigning geographical information to a landscape photograph. The system includes a storage and a processor operatively coupled to the storage. The storage may, for example, include a non-transitory computer readable medium. The processor is configured to execute instructions stored in the storage that when executed cause the processor to carry out a process including calculating a two-dimensional ideal view projection of a camera used to take the landscape photograph based at least in part on a geographic location of the camera when the landscape photograph was taken and a field of view of the camera when the landscape photograph was taken; selecting, from a three-dimensional terrain map representing a plurality of topographical features within a geographic region, at least one of the topographical features based on the two-dimensional ideal view projection, the at least one of the topological features being visible from the camera; and assigning, to the landscape photograph, at least one geographic location tag (GTL) representing at least one of the selected topographical features. In some cases, the calculating of the two-dimensional ideal view projection includes calculating a visible distance of the camera based at least in part on an elevation of the geographic location of the camera; and calculating an arc of consideration based at least in part on an angle of view of the camera and the visible distance, where the two-dimensional ideal view projection comprises a circular sector defined by the arc of consideration and the geographic location of the camera. In some cases, the selecting of the at least one of the topographical features includes selecting a subset of the topographical features that are within the two-dimensional ideal view projection and for which a dot product of a projected normal vector of each of the topographical features in the subset and a direction vector of the camera is non-positive. In some such cases, the direction vector of the camera bisects the arc of consideration. In some cases, the selecting of the at least one of the topographical features includes rendering the at least one of the selected topographical features onto a simulated camera frame using a z-buffer algorithm, where the at least one GTL assigned to the landscape photograph represents the at least one of the selected topographical features rendered at a z-buffer depth closest to the simulated camera frame. In some cases, the at least one GTL assigned to the landscape photograph represents a portion of the geographic region having at least two adjacent selected topographical features. In some cases, the three-dimensional terrain map comprises a plurality of polygons, each polygon representing one of the topographical features as a function of a relative location within the geographic region, a height of a geographic location of the respective topological feature, a geographic coordinate of the respective topological feature, or any combination of these Another example embodiment provides a non-transitory computer program product having instructions encoded thereon that when executed by one or more computer processors cause the one or more computer processors to perform a process such as set forth in this paragraph.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method of assigning geographical information to a landscape photograph, the method comprising:
    calculating a two-dimensional ideal view projection of a camera used to take a digital image of the landscape photograph based at least in part on a geographic location of the camera when the landscape photograph was taken and a field of view of the camera when the landscape photograph was taken, the two-dimensional ideal view projection representing an area defined by a circular sector having a radius extending from the geographic location of the camera to a visible distance of the camera on a spheroid and an angle of view of the camera;
    selecting, from a three-dimensional terrain map representing a plurality of topographical features within a geographic region, at least one topographical feature based on the two-dimensional ideal view projection, the at least one selected topological feature being visible from the camera, wherein the three-dimensional terrain map comprises a plurality of polygons, a face of each polygon representing a respective surface of the topographical features, wherein the selecting of the at least one topographical feature includes selecting a subset of the topographical features that are within the two-dimensional ideal view projection and for which a dot product of a normal vector projected from the face of each polygon of each of the topographical features in the subset and a direction vector of the camera is non-positive; and
    assigning, to the digital image of the landscape photograph, geographic location tag (GTL) metadata representing the at least one selected topographical feature.

2. The method of claim 1, wherein the calculating of the two-dimensional ideal view projection comprises:
    calculating the visible distance of the camera based at least in part on an elevation of the geographic location of the camera; and
    calculating an arc of consideration based at least in part on an angle of view of the camera and the visible distance, wherein the two-dimensional ideal view projection comprises the circular sector defined by the arc of consideration and the geographic location of the camera.

3. The method of claim 1, wherein the direction vector of the camera bisects the arc of consideration.

4. The method of claim 1, wherein the selecting of the at least one topographical feature comprises rendering the at least one selected topographical feature onto a simulated camera frame using a z-buffer algorithm, and wherein the GTL metadata assigned to the digital image of the landscape photograph represents the at least one of the selected topographical features rendered at a z-buffer depth closest to the simulated camera frame.

5. The method of claim 1, wherein the GTL metadata assigned to the digital image of the landscape photograph represents a portion of the geographic region having at least two adjacent selected topographical features.

6. The method of claim 1, wherein each polygon represents one of the topographical features as a function of at least one of:
    a relative location within the geographic region,
    a height of a geographic location of the respective topological feature, and
    a geographic coordinate of the respective topological feature.

7. In a digital medium environment for processing images, a system for assigning geographical information to a landscape photograph, the system comprising:
    a storage; and
    a processor operatively coupled to the storage, the processor configured to execute instructions stored in the storage that when executed cause the processor to carry out a process comprising:
        calculating a two-dimensional ideal view projection of a camera used to take a digital image of the landscape photograph based at least in part on a geographic location of the camera when the landscape photograph was taken and a field of view of the camera when the landscape photograph was taken, the two-dimensional ideal view projection representing an area defined by a circular sector having a radius extending from the geographic location of the camera to a visible distance of the camera on a spheroid and an angle of view of the camera;
        selecting, from a three-dimensional terrain map representing a plurality of topographical features within a geographic region, at least one topographical feature based on the two-dimensional ideal view projection, the at least one selected topological feature being visible from the camera, wherein the three-dimensional terrain map comprises a plurality of polygons, a face of each polygon representing a respective surface of the topological features, wherein the selecting of the at least one topographical feature includes selecting a subset of the topographical features that are within the two-dimensional ideal view projection and for which a dot product of a normal vector projected from the face of each polygon of each of the topographical features in the subset and a direction vector of the camera is non-positive; and assigning, to the digital image of the landscape photograph, geographic location tag (GTL) metadata representing the at least one selected topographical feature.

8. The system of claim 7, wherein the calculating of the two-dimensional ideal view projection comprises:
calculating the visible distance of the camera based at least in part on an elevation of the geographic location of the camera; and
calculating an arc of consideration based at least in part on an angle of view of the camera and the visible distance, wherein the two-dimensional ideal view projection comprises the circular sector defined by the arc of consideration and the geographic location of the camera.

9. The system of claim 7, wherein the direction vector of the camera bisects the arc of consideration.

10. The system of claim 7, wherein the selecting of the at least one topographical feature comprises rendering the at least one selected topographical feature onto a simulated camera frame using a z-buffer algorithm, and wherein the GTL metadata assigned to the digital image of the landscape photograph represents the at least one selected topographical feature rendered at a z-buffer depth closest to the simulated camera frame.

11. The system of claim 7, wherein GTL metadata assigned to the digital image of the landscape photograph represents a portion of the geographic region having at least two adjacent selected topographical features.

12. The system of claim 7, wherein each polygon represents one of the topographical features as a function of at least one of:
a relative location within the geographic region,
a height of a geographic location of the respective topological feature, and
a geographic coordinate of the respective topological feature.

13. A non-transitory computer readable medium having instructions encoded thereon that when executed by one or more computer processors cause the one or more computer processors to perform a process comprising:
calculating a two-dimensional ideal view projection of a camera used to take a digital image of the landscape photograph based at least in part on a geographic location of the camera when the landscape photograph was taken and a field of view of the camera when the landscape photograph was taken, the two-dimensional ideal view projection representing an area defined by a circular sector having a radius extending from the geographic location of the camera to a visible distance of the camera on a spheroid and an angle of view of the camera;
selecting, from a three-dimensional terrain map representing a plurality of topographical features within a geographic region, at least one topographical feature based on the two-dimensional ideal view projection, the at least one selected topological feature being visible from the camera, wherein the three-dimensional terrain map comprises a plurality of polygons, a face of each polygon representing a respective surface of the topological features, wherein the selecting of the at least one topographical feature includes selecting a subset of the topographical features that are within the two-dimensional ideal view projection and for which a dot product of a normal vector projected from the face of each polygon of each of the topographical features in the subset and a direction vector of the camera is non-positive; and
assigning, to the digital image of the landscape photograph, geographic location tag (GTL) metadata representing the at least one selected topographical feature.

14. The non-transitory computer readable medium of claim 13, wherein the calculating of the two-dimensional ideal view projection comprises:
calculating a visible distance of the camera based at least in part on an elevation of the geographic location of the camera; and
calculating an arc of consideration based at least in part on an angle of view of the camera and the visible distance, wherein the two-dimensional ideal view projection comprises a circular sector defined by the arc of consideration and the geographic location of the camera.

15. The non-transitory computer readable medium of claim 13, wherein the selecting of the at least one topographical feature comprises rendering the at least one selected topographical feature onto a simulated camera frame using a z-buffer algorithm, and wherein GTL metadata assigned to the digital image of the landscape photograph represents the at least one selected topographical feature rendered at a z-buffer depth closest to the simulated camera frame.

16. The non-transitory computer readable medium of claim 13, wherein the GTL metadata assigned to the digital image of the landscape photograph represents a portion of the geographic region having at least two adjacent selected topographical features.

17. The non-transitory computer readable medium of claim 13, wherein each polygon represents one of the topographical features as a function of at least one of:
a relative location within the geographic region,
a height of a geographic location of the respective topological feature, and
a geographic coordinate of the respective topological feature.

18. The method of claim 1, further comprising rendering the at least one selected topographical feature onto a simulated camera frame based on one or more camera parameters including an imaging resolution, the field of view of the camera, an elevation of the geographic location of the camera, and/or the geographic location of the camera.

19. The method of claim 18, wherein the GTL metadata is based at least in part on at least two adjacent topographical features in the simulated camera frame.

20. The non-transitory computer readable medium of claim 13, wherein the direction vector of the camera bisects the arc of consideration.

* * * * *